United States Patent
Colding et al.

(10) Patent No.: US 11,007,498 B2
(45) Date of Patent: May 18, 2021

(54) LAYOUT FOR INTER-BED COOLING IN SULFURIC ACID PLANTS

(71) Applicant: HALDOR TOPSØE A/S, Kgs. Lyngby (DK)

(72) Inventors: Geert Colding, Stenløse (DK); Uffe Bach Thomsen, Vedbæk (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 16/650,616

(22) PCT Filed: Oct. 1, 2018

(86) PCT No.: PCT/EP2018/076620
§ 371 (c)(1),
(2) Date: Mar. 25, 2020

(87) PCT Pub. No.: WO2019/068625
PCT Pub. Date: Apr. 11, 2019

(65) Prior Publication Data
US 2020/0238241 A1    Jul. 30, 2020

(30) Foreign Application Priority Data
Oct. 5, 2017 (DK) .......................... PA 2017 00556

(51) Int. Cl.
*C01B 17/765* (2006.01)
*B01J 8/04* (2006.01)
*C01B 17/80* (2006.01)

(52) U.S. Cl.
CPC .......... *B01J 8/0469* (2013.01); *B01J 8/0496* (2013.01); *C01B 17/765* (2013.01);
(Continued)

(58) Field of Classification Search
None
See application file for complete search history.

(56) References Cited

U.S. PATENT DOCUMENTS

| | | | |
|---|---|---|---|
| 3,536,446 A | 10/1970 | Maurer | |
| 3,653,828 A | 4/1972 | Connor et al. | |

(Continued)

FOREIGN PATENT DOCUMENTS

| | | |
|---|---|---|
| CN | 107010607 A | 8/2017 |
| CN | 107055488 A | 8/2017 |
| DE | 102015114871 A1 | 3/2017 |

OTHER PUBLICATIONS

International Search Report (PCT/ISA/210) dated Nov. 28, 2018, by the European Patent Office as the International Searching Authority for International Application No. PCT/EP2018/076620.

(Continued)

*Primary Examiner* — Jelitza M Perez
(74) *Attorney, Agent, or Firm* — Buchanan Ingersoll & Rooney P.C.

(57) ABSTRACT

In a converter for the catalytic oxidation of $SO_2$ to $SO_3$ in a sulfuric acid plant, which comprises a boiler section for the cooling of process gas between catalytic layers (beds), one or more water tube boilers (inter-bed boilers) having horizontal or slightly sloped tubes are used to cool the process gas between the catalytic layers (beds) in the converter. Each water tube boiler is provided with a process gas side bypass to control the temperature to the downstream catalyst layer.

14 Claims, 2 Drawing Sheets

(52) U.S. Cl.
CPC ..... *C01B 17/803* (2013.01); *B01J 2208/0053* (2013.01); *B01J 2208/00194* (2013.01)

(56) References Cited

U.S. PATENT DOCUMENTS

| | | |
|---|---|---|
| 3,656,900 A | 4/1972 | Drechsel et al. |
| 4,046,866 A * | 9/1977 | Hurlburt ............... C01B 17/765 |
| | | 423/533 |
| 2010/0092374 A1* | 4/2010 | Erkes ................. C01B 17/7655 |
| | | 423/533 |
| 2015/0147266 A1 | 5/2015 | Møllerhøj |
| 2018/0244522 A1 | 8/2018 | Thielert et al. |

OTHER PUBLICATIONS

Written Opinion (PCT/ISA/237) dated Nov. 28, 2018, by the European Patent Office as the International Searching Authority for International Application No. PCT/EP2018/076620.

Search Report and Opinion dated Apr. 5, 2018, by the Danish Patent and Trademark Office in priority application No. PA 2017 00556 (8 Pages).

* cited by examiner

Fig. 1A
Fig. 1B
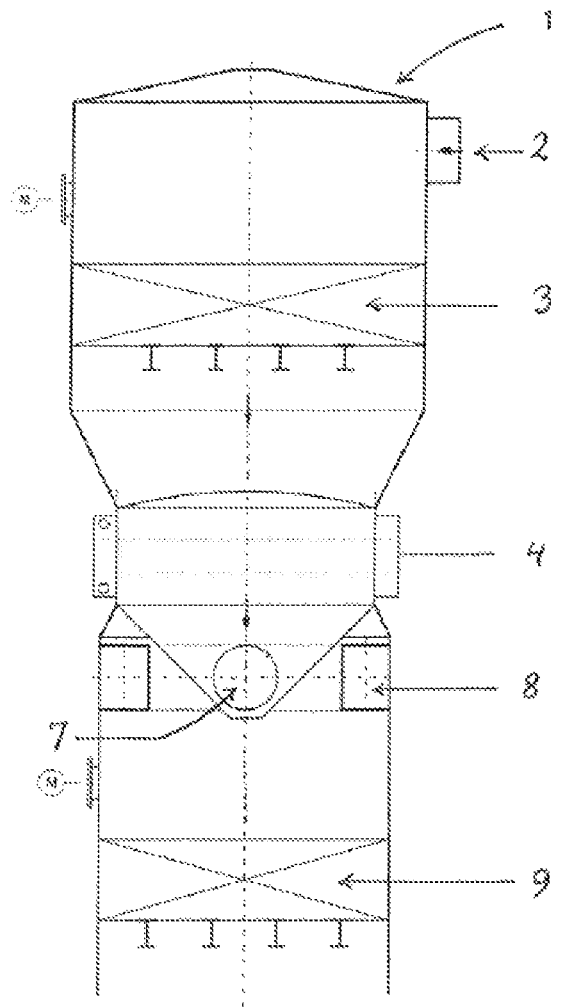
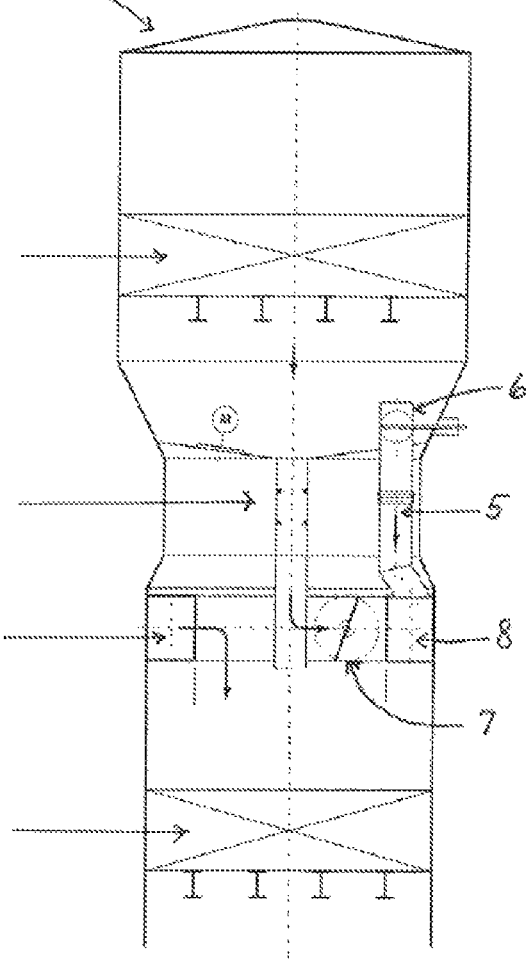
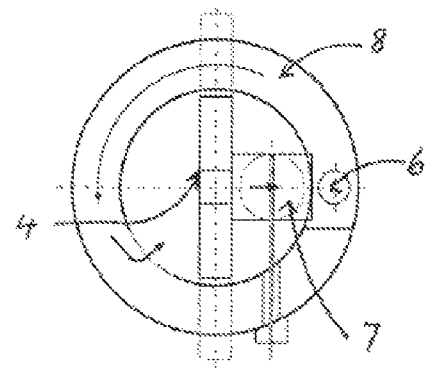
Fig. 1C

LAYOUT FOR INTER-BED COOLING IN SULFURIC ACID PLANTS

TECHNICAL FIELD

The present invention belongs to the field of sulfuric acid production from feed gases containing sulfurous components like $H_2S$, $SO_2$, $CS_2$ and COS or liquid feeds like molten sulfur and spent sulfuric acid, originating from e.g. alkylation technologies. Specifically, the invention relates to the design of water tube boilers for inter-bed cooling in $SO_2$ converters in sulfuric acid plants and, more specifically, to a bypass and mixer arrangement for a water tube boiler in a converter for the catalytic oxidation of $SO_2$ to $SO_3$ ($SO_2$ converter).

BACKGROUND

A water tube boiler is a type of boiler in which water and saturated steam circulates in tubes that are heated externally by e.g. hot process gas.

The circulation of the water and steam is usually accomplished by natural circulation caused by density differences between the water added to the inlet of the boiler and the water/steam mixture leaving the boiler. Alternatively, a water circulation pump located upstream the inlet to the boiler can be used.

Sulfuric acid ($H_2SO_4$) is an important commodity chemical, the production of which exceeds 200 million tons/year. It is primarily used for fertilizer production, but it is also used e.g. in the manufacture of viscose fibers, pigments, in batteries, in the metallurgical industry and in refining industry.

In the wet gas sulfuric acid (WSA) plant, the sulfurous feed components are typically converted into $SO_2$ in a thermal combustor. The $SO_2$ gas is then further oxidized to $SO_3$ according to the below reaction, using a catalyst active for oxidation of $SO_2$:

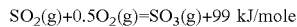

$$SO_2(g)+0.5O_2(g)=SO_3(g)+99 \text{ kJ/mole}$$

Because the above reaction is an equilibrium reaction, and the oxidation of $SO_2$ is exothermal, higher temperatures will decrease the maximum obtainable conversion of $SO_2$ to $SO_3$. For this reason, an industrial $SO_2$ converter is normally configured as a number of adiabatic catalytic layers (beds) with inter-bed cooling to maximize the overall conversion. The outlet temperature for each successive catalyst layer is decreased to increase the overall conversion.

Downstream the $SO_2$ converter, the $SO_3$ formed is reacted with $H_2O$ to form $H_2SO_4$, and then the $H_2SO_4$ is separated from the gas phase in a condensation step, producing concentrated commercial grade $H_2SO_4$ and a cleaned process gas, either to be sent directly to a stack or sent to further cleaning before being emitted to the atmosphere.

Besides the obvious purpose of producing sulfuric acid and securing as low emissions to the atmosphere as possible, the sulfuric acid plant is increasingly met with a demand to increase the thermal efficiency of the operation. A high degree of energy recovery either reduces the need for any (expensive) support fuel/heat or increases the export of high value energy, e.g. in the form of high pressure steam.

With demands for both high sulfuric acid production (low emissions) and high heat recovery, the complexity of the entire plant can increase quite significantly, and this is especially true for some sulfuric acid plant configurations, in which the energy evolved during the chemical conversion in combustors and/or catalytic converters is relatively low. The high complexity of the plant may decrease the flexibility and operability of the plant.

U.S. Pat. No. 3,536,446 describes a sulfuric acid process in which the initial hot process gas stream produced by sulfur combustion is divided into two portions. The first gas portion is cooled, and a portion of its $SO_2$ content is converted catalytically to $SO_3$, which is then absorbed in a concentrated sulfuric acid solution to form a further amount of sulfuric acid. The residual first gas portion is heated by direct addition of the second gas portion, and the $SO_2$ content of the resulting combined gas stream is catalytically converted to $SO_3$. The combined gas stream is cooled and then scrubbed with a concentrated sulfuric acid solution to absorb $SO_3$ and form additional sulfuric acid. The residual tail gas from the process is substantially free of sulfur oxides. The present invention differs from this known layout in that it comprises a process gas bypass for each of the inter-bed coolers.

SUMMARY

In general, the present invention provides an improvement to the current process layout, where high sulfuric acid production, high heat recovery and low complexity are combined, providing optimal operation of the plant. At the same time, the investment cost of this new layout is decreased compared to the currently used plant layout.

More specifically, the invention relates to the way the inter-bed cooling is carried out, i.e. the cooling of hot process gas leaving a catalyst layer to a specific and well controlled inlet temperature to the next catalyst layer. Inter-bed cooling is typically carried out in a heat exchanger using molten heat transfer salt, process gas (converted or unconverted), air or steam (saturated or superheated) as the cooling media or by quenching with colder air or process gas. For most plants, the inter-bed cooling of the process gas is carried out with saturated or slightly superheated high pressure steam, cooling the hot process gas by (further) superheating the steam. The process gas temperature out of the inter-bed cooler is controlled by adjusting the flow of steam to the inter-bed cooler, which means that there must be a steam bypass around the inter-bed cooler.

This inter-bed cooler works well, but it is expensive as both the heat exchanger and bypass valve must be constructed of high alloyed steel. Also for this inter-bed cooler to work well, a sufficient amount of steam is required, typically produced somewhere else within the sulfuric acid plant. For feeds with low caloric values it can be a challenge to produce a sufficient amount of steam for the inter-bed cooler(s).

The inter-bed cooler can be placed either within the $SO_2$ converter shell or on the outside of the $SO_2$ converter shell. For WSA plants, it is the general practice to use inter-bed coolers located inside the $SO_2$ converter shell, such that cold areas of the heat exchanger are avoided, thus reducing the risk of sulfuric acid condensation and corrosion.

There are two main challenges when introducing water tube boilers for inter-bed cooling in WSA plants:

(1) Since the process gas temperature downstream a boiler is too low (for $SO_2$ conversion) and generally uncontrollable, a shell-side hot process gas bypass must be installed to control the process gas temperature to the downstream catalyst layer. In order to be able to force sufficient gas through the bypass instead of through the tube bundle, it is required/recommended to have dampers both on the bypass line and on the line either upstream or downstream the boiler.

The gas from the inter-bed boiler and the gas from the bypass will have significant temperature differences, which means that these streams require mixing before entering the downstream catalyst layer. This is especially relevant for the last inter-bed cooling section, where the final catalyst layer is operating close to the minimum allowed temperature to provide the highest $SO_2$ conversion: A temperature variation of a few degrees Celsius can cause insufficient conversion in the final catalyst layer. For this application, an efficient mixing arrangement is required.

(2) The horizontal water tube boiler design is well known within the WSA technology, and it is known as a very efficient and generally trouble-free construction. This water tube boiler (process gas cooler) is typically located downstream the final catalyst layer, where the process gas temperature is at the lowest value. As there is no requirement for accurate temperature control, all process gas is passed through the boiler.

In the process gas cooler, the mechanical design temperature on the tube side and on the shell side are identical due to the risk of formation of stagnant steam pockets, which locally could cause the boiler tube temperature to approach the shell side temperature.

In the process gas cooler, the process gas temperature at the inlet to the boiler is typically from 380° C. up to 450° C. Thus, the corresponding mechanical design temperature will not be higher than around 480° C., which is still well within the range for low alloy carbon steel.

However, when applying the same design at the higher shell side operating temperatures, which are found especially in the first inter-bed cooler, certain concerns arise. The process gas temperature can be up to 600° C. or higher, which limits the possible choice of construction materials for the heat exchanger.

By introducing slope of the tubes in the tube bundle and designing the tube side such that the correct flow regime is formed, the formation of these stagnant steam pockets can be eliminated and it becomes possible to use lower mechanical design temperatures for the tubes and thus use low alloy steel or carbon steel.

The slope can be as low as 3° and as high as 45°; to reduce height of the tube bundle, the lowest possible slope should be chosen.

The tubes can be arranged in a single pass layout or with multiple passes (i.e. introducing tube bends), depending on the converter shell diameter and the required tube length. For tubes in single pass layout it may be considered to use multiple passes on the shell side to increase heat transfer rates and thus reduce the size of the tube bundle. The drawback is a higher process gas pressure drop and an increased complexity of the boiler construction.

The main advantage of using an inter-bed boiler with horizontal or slightly sloped tubes is the compact design, where the total height of the $SO_2$ converter is kept at a minimum. This reduces the amount of $SO_2$ converter shell material significantly. If the required tube length is longer than the inner diameter of the converter, multiple tube passes must be used.

The present invention provides a design layout, where high sulfuric acid production, high heat recovery and low complexity are combined, providing optimal operation of the plant.

At the same time, the investment cost of this new layout is lower than that of the currently used plant layout. More specifically, the idea is to use water tube boilers for the inter-bed cooling as an alternative to superheaters. This will result in a significant simplification of the overall process layout and substantial cost reductions due to a lower total heat exchange area and use of cheaper construction materials.

The reason for the reduced heat exchanger area is the higher temperature differences in a boiler compared to a superheater and a higher heat transfer coefficient on the tube side because boiling water has a much higher heat transfer coefficient compared to steam.

More specifically, the present invention concerns a converter for the catalytic oxidation of $SO_2$ to $SO_3$ in a sulfuric acid plant, said converter comprising a boiler section for the cooling of process gas between catalytic layers (beds), wherein one or more water tube boilers (inter-bed boilers) are used instead of conventional steam superheaters to cool the process gas between the catalytic layers (beds) in the $SO_2$ converter of the plant, and wherein each water tube boiler is provided with a process gas side bypass to control the temperature to the downstream catalyst layer.

In the inter-bed boiler section of the converter according to the invention, the tubes can be horizontal or they can have a small slope, typically <15°, while the gas flow is vertical. In another embodiment, the tubes can be vertical, while the gas flow is horizontal.

In a preferred design, each water tube boiler is provided with a shell-side process gas bypass.

In order to have the full control range of process gas distribution between the boiler tubes and bypass line, dampers are preferably installed on the bypass line and the process gas line upstream or downstream the boiler tubes. It is especially preferred that the layout comprises a damper on the cooled process gas line between the inter-bed boiler outlet and the mixing point with hot bypassed process gas.

The boiler layout preferably comprises a damper for the process gas going to the inter-bed boiler, the damper being located between the outlet of the upper catalyst layer and the inlet to the inter-bed boiler.

Full bypass control is especially preferred during e.g. low load operation and start-ups, where less or no cooling is required and a high bypass ratio is desired.

Further it is preferred that the design comprises a mixer arrangement to minimize the temperature variation at the inlet to the catalyst layer below.

The tubes in the water tube boilers can be bare, be fitted with fins, or have a combination of finned and bare tubes in the tube bundle. The tubes can be arranged in a single pass or in multiple passes. Similarly, the process gas side can have one or more passes. For horizontal boilers, the preferred layout is one or more passes on the water side and a single pass on the process gas side. This provides a compact design with the lowest process gas side pressure loss.

In the boiler design of the invention, at least one inter-bed boiler is preferably placed within the $SO_2$ converter shell, but it can also be placed outside the $SO_2$ converter shell.

In some cases, the sulfuric acid plant is required to provide superheated export steam and thus it can be necessary to use a combination of a traditional steam based inter-bed cooler and inter-bed boiler, both located between the same two catalyst layers, either in parallel or in series. The actual layout of these two heat exchangers will depend on the required degree of superheating of the steam, the material selection and the size of the heat exchangers.

In another case, it may be advantageous to combine the inter-bed boiler with a gas/gas heat exchanger, both located between the same two catalyst layers. This is relevant if e.g. the process gas entering the acid plant is cold and needs to be heated up to the 380-420° C. at the inlet to the SO$_2$ converter. Here a gas/gas exchanger will provide the most efficient heating of the cold process gas, and any surplus heat will then be transferred to the inter-bed boiler.

BRIEF DESCRIPTION OF THE DRAWINGS

The figures show an SO$_2$ converter in which the inter-bed cooling is carried out by an inter-bed boiler and a hot bypass followed by a mixing device. More specifically, FIGS. 1A-1C show shows an inter-bed boiler having horizontal or slightly sloped tubes, and the gas flow is vertical in downwards direction.

DETAILED DESCRIPTION

Figures 2A, 2B:
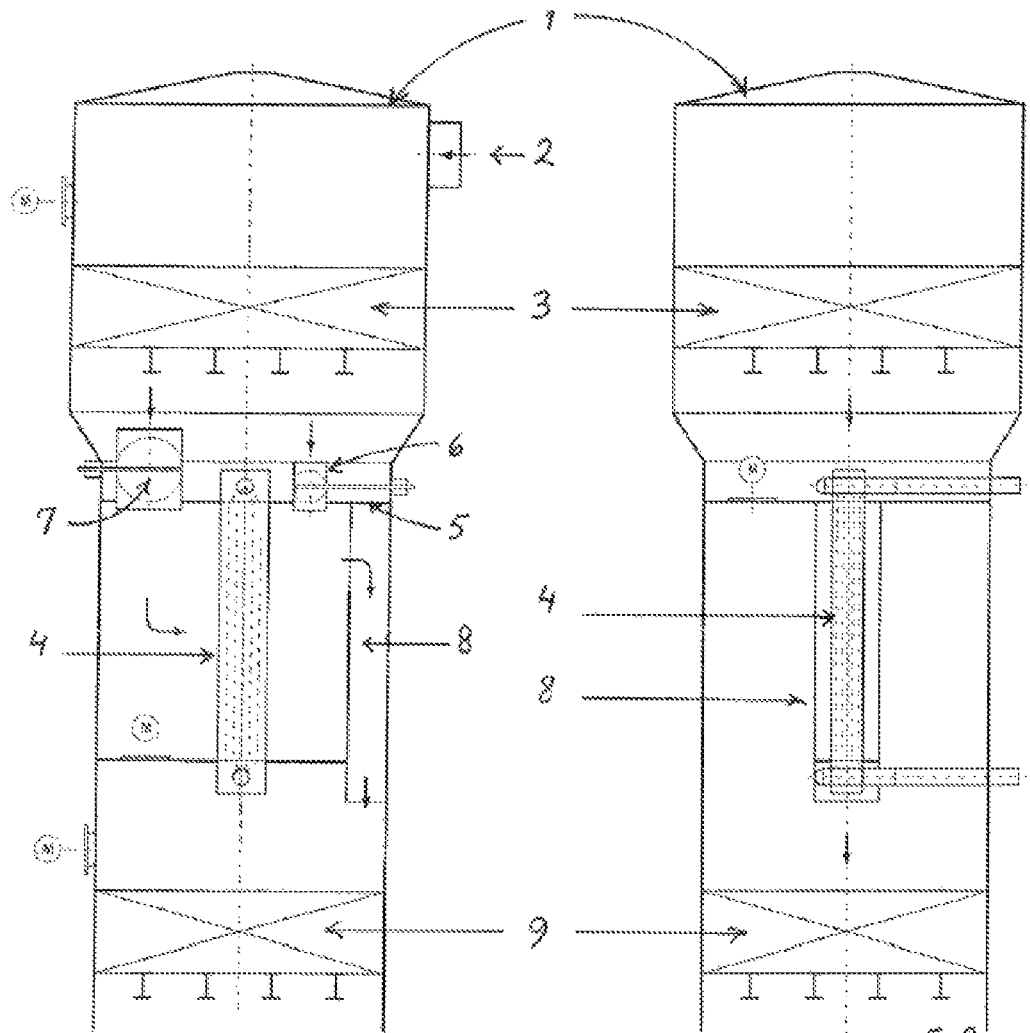
FIGS. 2A-2C show an inter-bed boiler having vertical tubes, and the gas flow is horizontal.

In FIG. 1, the inter-bed boiler layout with horizontal (or slightly sloped) tubes is shown in two side views (A and B) and as top view (C). Unconverted process gas comprising SO$_2$ enters the SO$_2$ converter (1) through the inlet nozzle (2) located at the top of the converter.

The process gas flows downwards through the upper catalyst layer (3), where a fraction of the SO$_2$ is converted into SO$_3$, increasing the process gas temperature. The hot, partly converted process gas flows down to the inter-bed cooling section, where a horizontal water tube boiler (4) is located. To increase the process gas velocity around the inter-bed boiler tubes, the cross sectional area for process gas flow is significantly decreased.

The hot process gas passing through the inter-bed boiler is cooled to a temperature below the inlet temperature to the downstream catalyst layer (9). To reach the desired catalyst inlet temperature, a fraction of the hot, partly converted process gas is bypassed the inter-bed boiler by passing through the hot bypass damper (6) via the hot gas line (5) to the mixing chamber (8), where the hot process gas is mixed with the cooled process gas. To enhance the controllability of the streams being cooled or bypassed, the cooled gas is also provided with a damper (7). This damper can either be located upstream or downstream of the inter-bed boiler, depending on the actual layout of the inter-bed cooling section. The damper positions are controlled from the outside of the converter via a long rod between the damper plate and the actuator. An active sealing (e.g. purging air) between rod and converter shell is required to avoid process gas escaping to the atmosphere. In the figure, the mixing chamber (8) is a duct located at the periphery of the converter shell, such that the total height of the inter-bed cooling section is minimized. The well mixed, partly converted process gas leaves the outlet of the mixing chamber and flows down to the lower catalyst layer for further SO$_2$ conversion.

Normally the process gas distributes evenly across the entire cross section of the lower catalyst layer within the first 10-20 cm of the catalyst layer. Alternatively, distributor plates, guide vanes etc. can be installed between the mixer outlet and the lower catalyst layer.

Figure 2C:
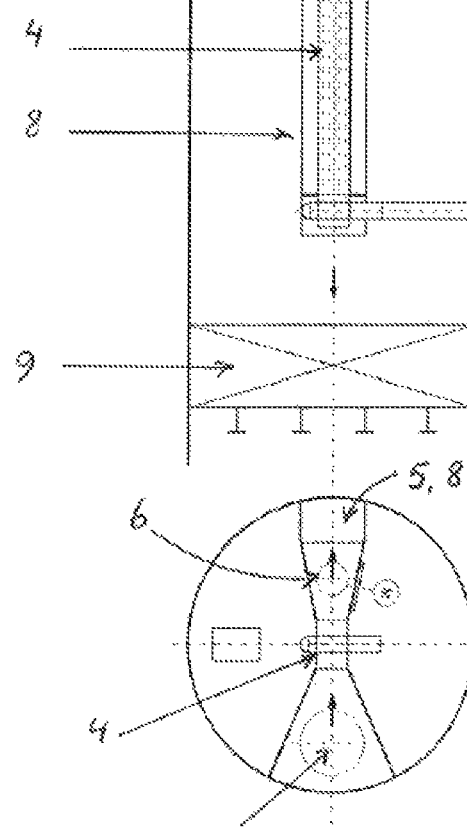

In FIG. 2, also shown in two side views (A and B) and as top view (C), the inter-bed boiler has vertical tubes, and the gas flow is horizontal. The advantage of vertical tubes in the boiler is that the risk of steam pocket formation and thus metal overheating is avoided, independent of the flow regimes inside the boiler tubes. The disadvantage is a significantly higher inter bed boiler, requiring more converter shell material and thus increasing the total cost of the solution.

As in FIG. 1, the unconverted process gas enters the SO$_2$ converter (1) via the inlet nozzle (2) and is partly converted in the upper catalyst layer (3). The inter-bed boiler (4) is vertically oriented, and the process gas damper (7) is most conveniently located in the hot section. The bypass damper (6) passes hot process gas via the hot gas line (5) to the mixing point (8) of the cooled and uncooled process gas. In this layout, the mixing chamber/duct is vertical and connected to the converter shell, but it could also be a circular duct around the periphery of the shell as in FIG. 1. The well mixed, partly converted process gas leaves the mixing chamber and flows down to the lower catalyst layer (9).

The process gas bypass and the mixer can be made in a compact design to fit internally in any SO$_2$ converter. The mixer can have many specific layouts, such as a curved duct with or without internal structures to increase turbulence. The mixer can also be located outside the SO$_2$ converter shell, but that is not recommended as it increases the risk of cooling the mixing chamber surfaces to a temperature below the sulfuric acid dew point with the consequence of sulfuric acid condensation and rapid corrosion.

The use of water tube boilers for inter-bed cooling in a WSA plant provides a reduction in plant cost and complexity compared to the traditional steam superheaters used for inter-bed cooling. In order to control the gas temperature outlet from the inter-bed boiler, a bypass is required on the gas side, and in order to minimize temperature variation at the inlet to the lower catalyst layer, an efficient mixer is required.

The invention claimed is:

1. A converter comprising a converter shell for the catalytic oxidation of SO$_2$ to SO$_3$ in a sulfuric acid plant, said converter comprising a boiler section for the cooling of process gas between an upstream catalytic layer and a downstream catalytic layer,
   wherein the boiler section comprises one or more water tube boilers used to cool the process gas between the upstream catalytic layer and the downstream catalytic layer in the converter of the plant,
   wherein the converter further comprises a hot gas line attached to the upstream catalytic layer so that some process gas bypasses the boiler section, wherein the hot gas line is used to control the temperature of the downstream catalytic layer, and
   the converter further comprising a cooled process gas line from the boiler section, wherein a damper is located on the cooled process gas line and/or the hot gas line.

2. The converter according to claim 1, wherein each water tube boiler has horizontal or slightly sloped tubes, and the gas flow is vertical.

3. The converter according to claim 2, wherein the tube slope is in the range 0° to 15° from horizontal.

4. The converter according to claim 2, wherein the tubes have one or more passes.

5. The converter according to claim 1, wherein the one or more water tube boilers have vertical tubes, and the gas flow is horizontal.

6. The converter according to claim 1, wherein the tubes of the water tube boilers are bare, fitted with fins or have a combination of finned and bare tubes.

7. The converter according to claim 1, wherein at least one water tube boiler is placed within the converter shell.

8. The converter according to claim 1, wherein at least one water tube boiler is placed outside the converter shell.

9. The converter according to claim 1, further comprising a mixing point that receives the bypassed process gas from the hot gas line and cooled process gas from a cooled process gas line from the boiler section, wherein the converter comprises a damper on the cooled process gas line between an outlet of the boiler section and the mixing point.

10. The converter according to claim 9, further comprising a mixer downstream from the mixing point.

11. The converter according to claim 1, wherein an amount of bypassed process gas and/or an amount of cooled process gas are controllable.

12. The converter according to claim 1, wherein the damper is on the hot gas line.

13. A converter comprising a converter shell for the catalytic oxidation of $SO_2$ to $SO_3$ in a sulfuric acid plant, said converter comprising a boiler section for the cooling of process gas between an upstream catalytic layer and a downstream catalytic layer, wherein the boiler section comprises one or more water tube boilers used to cool the process gas between the upstream catalytic layer and the downstream catalytic layer in the converter of the plant, wherein the converter further comprises a hot gas line attached to the upstream catalytic layer so that some process gas bypasses the boiler section, wherein the hot gas line is used to control the temperature of the downstream catalytic layer, and the converter further comprising a mixing point that receives the bypassed process gas from the hot gas line and cooled process gas from the boiler section, wherein the converter comprises a damper for the process gas going to the boiler section, said damper being located between an outlet of the upstream catalytic layer and an inlet to the boiler section.

14. The converter according to claim 13, further comprising a mixer downstream from the mixing point.

\* \* \* \* \*